US011366907B2

(12) United States Patent
Ikeda

(10) Patent No.: US 11,366,907 B2
(45) Date of Patent: Jun. 21, 2022

(54) MALWARE ANALYSIS DEVICE, MALWARE ANALYSIS METHOD, AND STORAGE MEDIUM HAVING MALWARE ANALYSIS PROGRAM CONTAINED THEREIN

(71) Applicant: NEC CORPORATION, Tokyo (JP)

(72) Inventor: Satoshi Ikeda, Tokyo (JP)

(73) Assignee: NEC CORPORATION, Tokyo (JP)

(*) Notice: Subject to any disclaimer, the term of this patent is extended or adjusted under 35 U.S.C. 154(b) by 583 days.

(21) Appl. No.: 16/341,150

(22) PCT Filed: Oct. 11, 2017

(86) PCT No.: PCT/JP2017/036762
§ 371 (c)(1),
(2) Date: Apr. 11, 2019

(87) PCT Pub. No.: WO2018/070404
PCT Pub. Date: Apr. 19, 2018

(65) Prior Publication Data
US 2020/0193030 A1 Jun. 18, 2020

(30) Foreign Application Priority Data
Oct. 14, 2016 (JP) .............................. JP2016-202644

(51) Int. Cl.
*G06F 21/57* (2013.01)
*G06F 11/32* (2006.01)
(Continued)

(52) U.S. Cl.
CPC .......... *G06F 21/577* (2013.01); *G06F 11/327* (2013.01); *G06F 21/561* (2013.01); *G06F 21/563* (2013.01); *G06F 21/564* (2013.01)

(58) Field of Classification Search
CPC .... G06F 21/577; G06F 21/561; G06F 21/563; G06F 21/564; G06F 21/56; G06F 21/566; G06F 21/50; G06F 21/52; G06F 21/53
See application file for complete search history.

(56) References Cited

U.S. PATENT DOCUMENTS

2013/0074185 A1* 3/2013 McDougal ............ G06F 21/561
726/24
2017/0251003 A1* 8/2017 Rostami-Hesarsorkh ..................
H04L 63/1425

FOREIGN PATENT DOCUMENTS

JP 2008-176752 A 7/2008
JP 2008-176753 A 7/2008
(Continued)

OTHER PUBLICATIONS

Yuji Hoshizawa, et al., "Automation malware Classification", IPSJ SIG Technical Report, Jul. 20, 2007, vol. 38, No. 39, pp. 271 to 278 (8 pages total).
(Continued)

Primary Examiner — Edward Zee
(74) Attorney, Agent, or Firm — Sughrue Mion, PLLC

(57) ABSTRACT

In order to analyze, efficiently and with high precision, the similarity in operation between software that is being examined and a known malware, this malware analysis device 40 is equipped with: an abstraction unit 41 for generating first abstraction information 410 obtained by abstracting first operation information 440 which indicates the result of an operation of sample software; an abstraction information storage unit 45 for storing second abstraction information 450 obtained by abstracting second operation information which indicates one or more operation results obtained for each piece of software that has been compared with the sample; a calculation unit 42 for calculating the similarity between the first abstraction information 410 and the second
(Continued)

abstraction information 450; and a specifying unit 43 for specifying the compared software for which the similarity satisfies a criteria.

18 Claims, 13 Drawing Sheets

(51) Int. Cl.
*G06F 21/56* (2013.01)
*G06F 21/00* (2013.01)

(56) References Cited

FOREIGN PATENT DOCUMENTS

| | | |
|---|---|---|
| JP | 2012-22380 A | 2/2012 |
| JP | 2015-121968 A | 7/2015 |
| JP | 2016-38721 A | 3/2016 |

OTHER PUBLICATIONS

International Search Report in International Application No. PCT/JP2017/036762, dated Dec. 12, 2017.
Keiichi Horiai, et al., "Automatic Malware Variant Classification by Hamming Distance", IPSJ SIG Technical Report, May 23, 2008, vol. 41. No. 11, pp. 61 to 66 (6 pages total).

\* cited by examiner

Fig. 2

160 ABSTRACTION RULE

| TYPE (type) | CONTENT OF ABSTRACTION PROCESSING FOR LOG ENTRY |
|---|---|
| process | • MAINTAIN type AND mode<br>• ABSTRACT path DOWN TO DEPTH "1" |
| registry | • MAINTAIN type AND mode<br>• ABSTRACT key DOWN TO DEPTH "2" |
| file | • MAINTAIN type AND mode<br>• ABSTRACT path DOWN TO DEPTH "1"<br>• EXTRACT EXTENSION INCLUDED IN path AS ITEM OF ext |
| network | • MAINTAIN type AND mode |

Fig. 3

140 SAMPLE OPERATION LOG

| SAMPLE ID | Seq. No. | LOG ENTRY |
|---|---|---|
| L1 | 1 | type:process, mode:start, path:¥temp¥abcde.exe, pid:111, parent_pid:10, timestamp:0 |
| L1 | 2 | type:registry, mode:set-value, key:HKCU¥software¥key1, value:1, pid:111, timestamp:100 |
| L1 | 3 | type:registry, mode:set-value, key:HKCU¥software¥key2, value:2, pid:111, timestamp:200 |
| L1 | 4 | type:file, mode:open, path:¥temp¥settings.txt, pid:111, timestamp:300 |
| L1 | 5 | type:file, mode:close, path:¥temp¥settings.txt, size:1024, pid:111, timestamp:400 |
| L1 | 6 | type:network, mode:dns, host:example.com, ip:192.168.0.1, pid:111, timestamp:500 |
| L1 | 7 | type:network, mode:http, host:example.com, headers:..., pid:111, timestamp:600 |
| L1 | 8 | type:file, mode:remove, path:¥system¥important.dat, pid:111, timestamp:700 |
| L1 | 9 | type:process, mode:stop, path:¥temp¥abcde.exe, pid:111, timestamp:800 |

Fig. 4

110 SAMPLE ABSTRACTION LOG

| SAMPLE ID | Seq. No. | LOG ENTRY |
|---|---|---|
| L1 | 1 | type:process, mode:start, path:¥temp |
| L1 | 2 | type:registry, mode:set-value, key:HKCU¥software |
| L1 | 3 | type:registry, mode:set-value, key:HKCU¥software |
| L1 | 4 | type:file, mode:open, path:¥temp, ext:txt |
| L1 | 5 | type:file, mode:close, path:¥temp, ext:txt |
| L1 | 6 | type:network, mode:dns |
| L1 | 7 | type:network, mode:http |
| L1 | 8 | type:file, mode:remove, path:¥system, ext:dat |
| L1 | 9 | type:process, mode:stop, path:¥temp |

Fig. 5

141 KNOWN MALWARE OPERATION LOG

| SAMPLE ID | Seq. No. | LOG ENTRY |
|---|---|---|
| L2 | 1 | type:process, mode:start, path:¥temp¥fghij.exe, pid:222, parent_pid:10, timestamp:0 |
| L2 | 2 | type:registry, mode:set-value, key:HKCU¥software¥key1, value:1, pid:222, timestamp:150 |
| L2 | 3 | type:process, mode:start, path:¥system¥cmd.exe, pid:333, parent_pid:222, timestamp:250 |
| L2 | 4 | type:file, mode:open, path:¥temp¥config.txt, pid:222, timestamp:350 |
| L2 | 5 | type:file, mode:close, path:¥temp¥config.txt, size:2048, pid:222, timestamp:450 |
| L2 | 6 | type:network, mode:dns, host:example.net, ip:192.168.0.2, pid:222, timestamp:550 |
| L2 | 7 | type:network, mode:http, host:example.net, headers:..., pid:222, timestamp:650 |
| L2 | 8 | type:file, mode:remove, path:¥system¥secret.dat, pid:222, timestamp:750 |
| L2 | 9 | type:process, mode:stop, path:¥system¥cmd.exe, pid:333, timestamp:850 |
| L2 | 10 | type:process, mode:stop, path:¥temp¥fghij.exe, pid:222, timestamp:950 |

Fig. 6

150 KNOWN MALWARE ABSTRACTION LOG

| SAMPLE ID | Seq. No. | LOG ENTRY |
|---|---|---|
| L2 | 1 | type:process, mode:start, path:¥temp |
| L2 | 2 | type:registry, mode:set-value, key:HKCU¥software |
| L2 | 3 | type:process, mode:start, path:¥system |
| L2 | 4 | type:file, mode:open, path:¥temp, ext:txt |
| L2 | 5 | type:file, mode:close, path:¥temp, ext:txt |
| L2 | 6 | type:network, mode:dns |
| L2 | 7 | type:network, mode:http |
| L2 | 8 | type:file, mode:remove, path:¥temp, ext:dat |
| L2 | 9 | type:process, mode:stop, path:¥system |
| L2 | 10 | type:process, mode:stop, path:¥temp |

Fig. 7

| LOG ENTRY | L1 | L2 | DIFFERENCE |
|---|---|---|---|
| type:process, mode:start, path:¥temp | 1 | 1 | 0 |
| type:process, mode:stop, path:¥temp | 1 | 1 | 0 |
| type:process, mode:start, path:¥system | 0 | 1 | 1 |
| type:process, mode:stop, path:¥system | 0 | 1 | 1 |
| type:registry, mode:set-value, key:HKCU¥software | 2 | 1 | 1 |
| type:file, mode:open, path:¥temp, ext:txt | 1 | 1 | 0 |
| type:file, mode:close, path:¥temp, ext:txt | 1 | 1 | 0 |
| type:file, mode:remove, path:¥system, ext:dat | 1 | 0 | 1 |
| type:file, mode:remove, path:¥system, ext:txt | 0 | 1 | 1 |
| type:network, mode:dns | 1 | 1 | 0 |
| type:network, mode:http | 1 | 1 | 0 |

Fig. 8

| EDIT ORDER | EDIT TYPE |
|---|---|
| 1 | COMMON |
| 2 | COMMON |
| 3 | DELETION |
| 4 | ADDITION  L2-3 |
| 5 | COMMON |
| 6 | COMMON |
| 7 | COMMON |
| 8 | COMMON |
| 9 | DELETION |
| 10 | ADDITION  L2-8 |
| 11 | ADDITION  L2-9 |
| 12 | COMMON |

Fig. 9A

| | L1 | | L2 |
|---|---|---|---|
| 1 | type:process, mode:start, path:¥temp | 1 | type:process, mode:start, path:¥temp |
| 2 | type:registry, mode:set-value, key:HKCU¥software | 2 | type:registry, mode:set-value, key:HKCU¥software |
| 3 | type:registry, mode:delete, key:HKCU¥software | | |
| | | 3 | type:process, mode:start, path:¥system |
| 4 | type:file, mode:open, path:¥temp, ext:txt | 4 | type:file, mode:open, path:¥temp, ext:txt |
| 5 | type:file, mode:close, path:¥temp, ext:txt | 5 | type:file, mode:close, path:¥temp, ext:txt |

Fig. 9B

| | L1 | | L2 |
|---|---|---|---|
| 6 | type:network, mode:dns | 6 | type:network, mode:dns |
| 7 | type:network, mode:http | 7 | type:network, mode:http |
| 8 | type:file, mode:remove, path:¥system, ext:dat | 8 | type:file, mode:remove, path:¥temp, ext:txt |
| | | 9 | type:process, mode:stop, path:¥system |
| 9 | type:process, mode:stop, path:¥temp | 10 | type:process, mode:stop, path:¥temp |

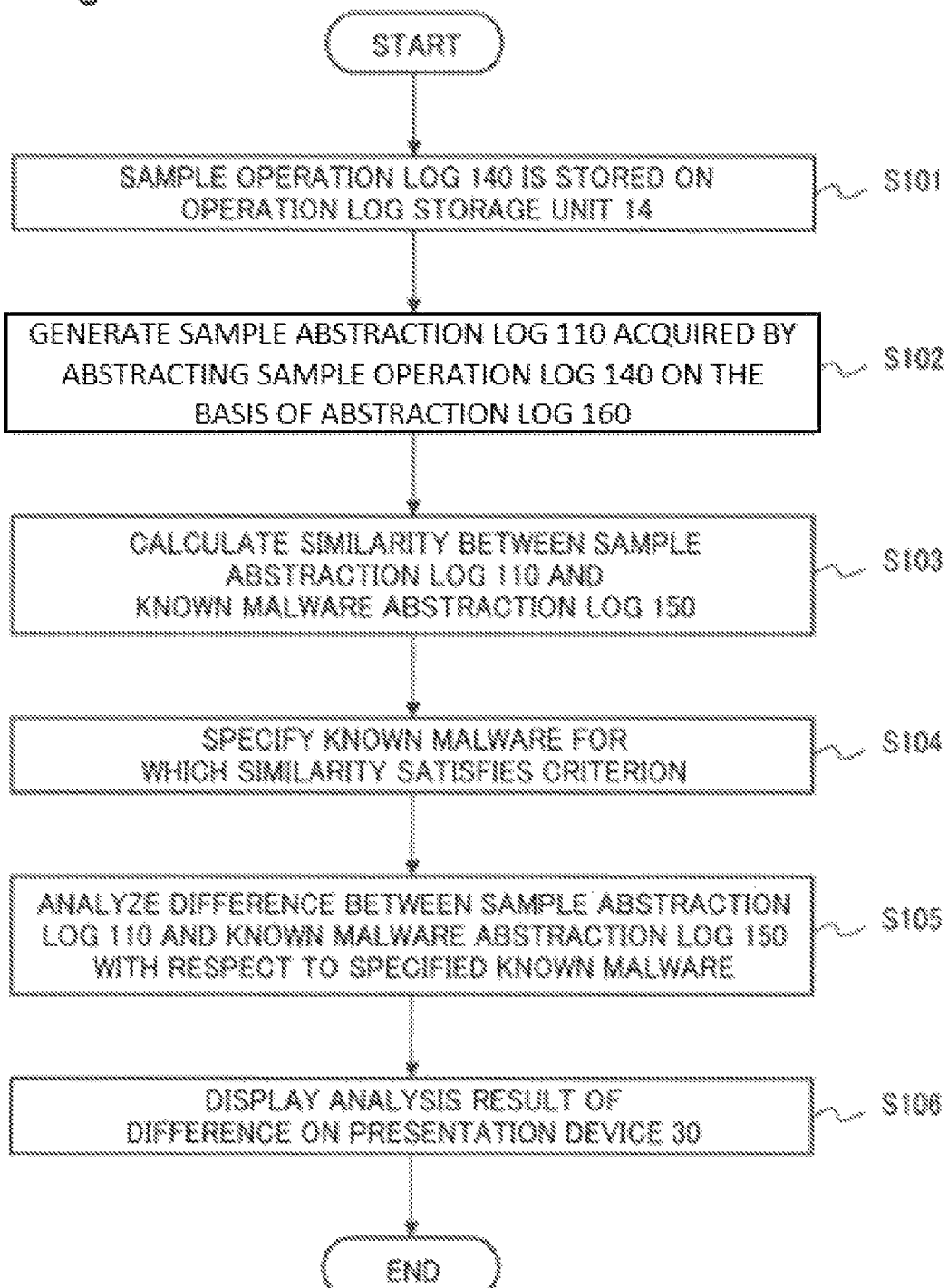

MALWARE ANALYSIS DEVICE, MALWARE ANALYSIS METHOD, AND STORAGE MEDIUM HAVING MALWARE ANALYSIS PROGRAM CONTAINED THEREIN

CROSS REFERENCE TO RELATED APPLICATIONS

This application is a National Stage of International Application No. PCT/JP2017/036762 filed Oct. 11, 2017, claiming priority based on Japanese Patent Application No. 2016-202644 filed Oct. 14, 2016, the disclosure of which is incorporated herein in its entirety by reference.

TECHNICAL FIELD

The present invention relates to a technique for analyzing, on the basis of an operation content of software suspected to be malware, an illegal operation of the software.

BACKGROUND ART

Recently, tens of thousands of new types of malware (software causing an illegal operation) appear daily, and influence of these pieces of malware on an advanced information oriented modern society has become very serious. Therefore, a demand for a technique for efficiently detecting and analyzing such malware is increasing.

As a technique relating to such a technique, PTL 1 discloses a log analysis device that analyzes a log in accordance with an attack scenario and reduces detection leakage when detecting a cyberattack. The device extracts, from among a plurality of attacks defined in an attack scenario, an attack before at least one attack that has not yet been detected by a detection device included in a computer system and in which an order defined in the attack scenario has been already detected by the detection device. The device analyzes a log of the computer system, determines whether the computer system has encountered the extracted attack or not, and determines that detection leakage of the attack has occurred when determining the encounter.

PTL 2 discloses a log extraction system configured to extract a portion effective for automatic analysis or visual verification from a log that records a behavior of an application, and delete an unnecessary portion. The system extracts identification information of a process being associated with identification information of a specific application from an application log. The system extracts a portion including the extracted identification information of a process from an application log. The system extracts a portion including the extracted identification information of a process from a kernel log. Then, the system deletes a part of the extracted portion in accordance with rule information and thereby aggregates the application log or the kernel log.

PTL 3 discloses a similarity examination method of comparing series data transmitted by malware that executes illegal processing for another computer on a network with series data transmitted by software to be examined, and examining similarity therebetween. The method acquires series data transmitted by malware and series data transmitted by software to be examined. The method normalizes both pieces of series data thereof by using Fourier transform and then calculates a correlation coefficient therebetween.

CITATION LIST

Patent Literature

[PTL 1] Japanese Unexamined Patent Application Publication No. 2015-121968

[PTL 2] Japanese Unexamined Patent Application Publication No. 2012-22380

[PTL 3] Japanese Unexamined Patent Application Publication No. 2008-176752

SUMMARY OF INVENTION

Technical Problem

One technique for detecting an illegal operation executed by malware is signature-type detection. In the signature-type detection, abnormal data or an operation pattern different from normal is previously defined as a signature, and data or an operation pattern matched with the signature is detected as an illegal operation executed by malware.

However, there is a problem that it is difficult for such signature-type detection to cope with new types of malware multifariously customized occurring one after another. As one technique for coping with such a problem, attention is paid to a technique of executing and detecting malware by using a sandbox. A sandbox is an isolated environment constructed, for example, as a virtual environment in order to execute software (a sample) to be examined and is an area (an execution environment of software) being protected and not affecting a system even when an illegal operation occurs. The technique of executing and detecting malware by using a sandbox executes a sample (an object to be examined) in the sandbox, monitors whether or not the sample exhibits a behavior characteristic of malware, and thereby detects that the sample is the malware. As a detection result at that time, in addition to a determination result about whether or not the sample is the malware, an operation log of the sample is output.

When malware is detected, an appropriate countermeasure needs to be taken according to a behavior of the sample. It is possible to confirm, for example, whether or not a subspecies of the detected malware has already intruded a network of an organization, by searching trace information extracted from an operation log of the sample. When similarity of a behavior of a sample is high, a similar countermeasure is effective, and therefore it is important to interpret presence or absence of detection in the past of a sample similar in operation to a detected sample.

It is required to incorporate various types of operation information occurring through an operation of a sample in an operation log, and therefore, usually an operation log (operation information included therein) is managed as unstructured data. Therefore, even with regard to pieces of operation information having the same type, items included therein may be different from each other. Further, even in the same sample, there is an item including data which take a different value depending on a timing of execution. Therefore, due to these characteristics of an operation log, there is a problem that, regardless of intrinsic similarity between operations, the similarity is concealed and accuracy in analysis of malware is decreased. PTLs 1 to 3 do not describe this problem. A main object of the present invention is to provide a malware analysis device and the like that solve the problem.

Solution to Problem

A malware analysis device according to one form of the present invention includes: an abstraction means that generates first abstraction information acquired by abstracting first operation information indicating an operation result of software being a sample; an abstraction information storage means that stores second abstraction information that is second operation information being abstracted, the second operation information indicating operation results acquired for each piece of one or more software being compared with the sample; a calculation means that calculates similarity between the first abstraction information and the second abstraction information; and a specifying means that specifies software for which the similarity satisfies a criterion, the software being compared with the sample.

In another aspect for achieving the object, a malware analysis method according to one form of the present invention includes: generating, by an information processing device, first abstraction information acquired by abstracting first operation information indicating an operation result of software being a sample when second abstraction information that is second operation information being abstracted, the second operation information indicating operation results acquired for each piece of one or more software being compared with the sample is stored on a storage means; calculating similarity between the first abstraction information and the second abstraction information; and specifying software for which the similarity satisfies a criterion, the software being compared with the sample.

Further, in yet another aspect for achieving the object, a malware analysis program according to one form of the present invention is a program for causing a computer accessible to a storage means that stores second abstraction information that is second operation information being abstracted, the second operation information indicating operation results acquired for each piece of one or more software being compared with a sample, to execute: abstraction processing of generating first abstraction information acquired by abstracting first operation information indicating an operation result of software being the sample; calculation processing of calculating similarity between the first abstraction information and the second abstraction information; and specifying processing of specifying software for which the similarity satisfies a criterion, the software being compared with the sample.

Further, the present invention may also be achieved by a computer-readable non-transitory recording medium storing the malware analysis program (computer program).

Advantageous Effects of Invention

The present invention is able to efficiently and highly accurately analyze similarity in operation between software to be examined and known malware.

BRIEF DESCRIPTION OF DRAWINGS

FIG. 2 is a diagram exemplarily illustrating a configuration of an abstraction rule 160 according to the first example embodiment of the present invention.

FIG. 3 is a diagram exemplarily illustrating a configuration of a sample operation log 140 according to the first example embodiment of the present invention.

FIG. 4 is a diagram exemplarily illustrating a configuration of a sample abstraction log 110 according to the first example embodiment of the present invention.

FIG. 5 is a diagram exemplarily illustrating a configuration of a known malware operation log 141 according to the first example embodiment of the present invention.

FIG. 6 is a diagram exemplarily illustrating a configuration of a known malware abstraction log 150 according to the first example embodiment of the present invention.

FIG. 7 is a table illustrating an example in which a calculation unit 12 according to the first example embodiment of the present invention calculates a Manhattan distance based on a frequency histogram.

FIG. 8 is a table illustrating an example in which a difference analysis unit 18 according to the first example embodiment of the present invention determines a shortest edit script SES.

FIG. 9A is a presentation example (1/2) in which a presentation control unit 19 according to the first example embodiment of the present invention presents a correspondence relationship of log entries to a presentation device 30 with respect to a sample abstraction log 110 and a known malware abstraction log 150.

FIG. 9B is a presentation example (2/2) in which the presentation control unit 19 according to the first example embodiment of the present invention presents a correspondence relationship of log entries to the presentation device 30 with respect to the sample abstraction log 110 and the known malware abstraction log 150.

FIG. 10 is a flowchart illustrating an operation of the malware analysis device 10 according to the first example embodiment of the present invention.

EXAMPLE EMBODIMENT

Hereinafter, example embodiments of the present invention are described in detail with reference to the drawings.

First Example Embodiment

Figure 1:
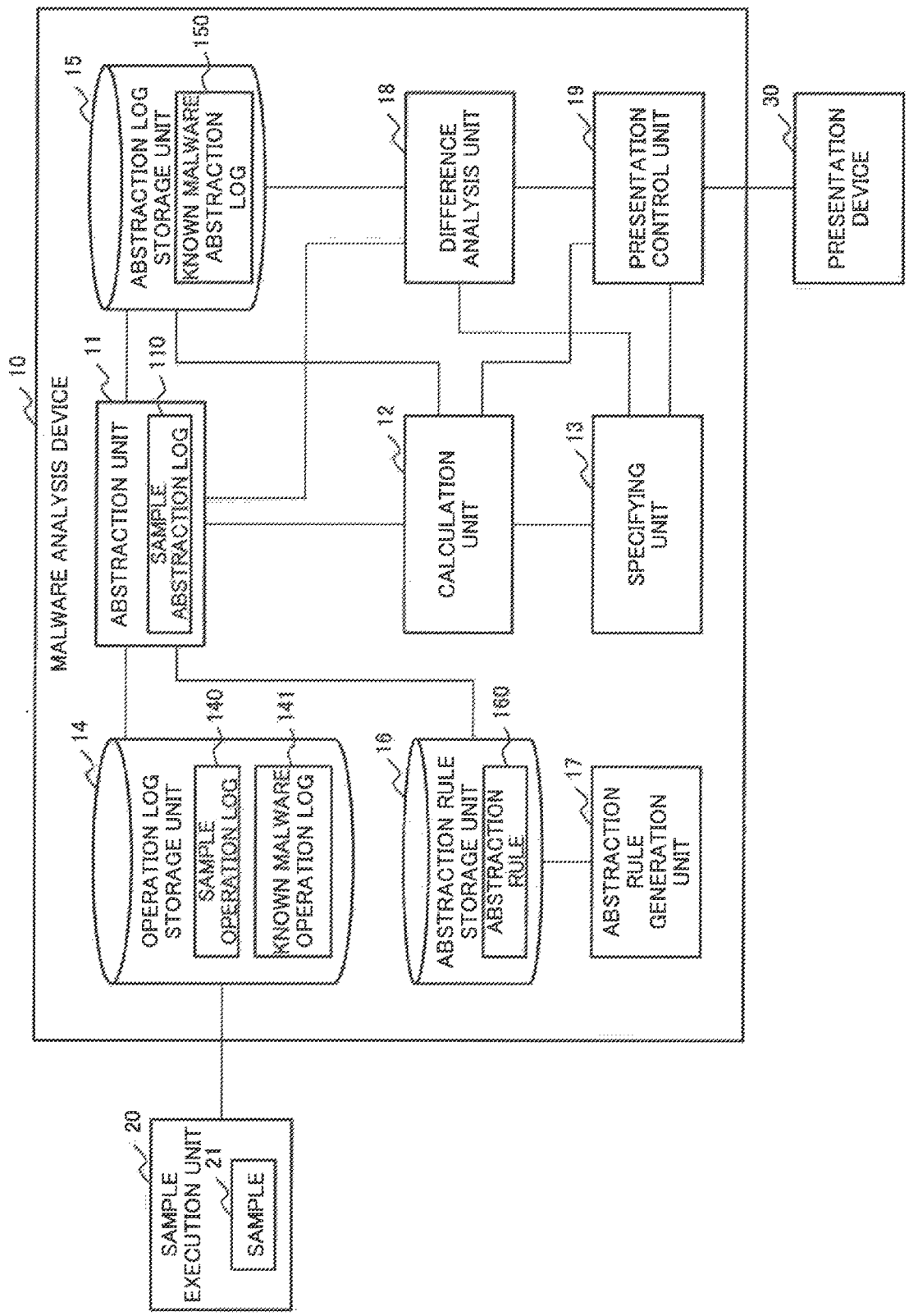
FIG. 1 is a block diagram illustrating a configuration of a malware analysis device 10 according to a first example embodiment of the present invention.

FIG. 1 is a block diagram conceptually illustrating a configuration of a malware analysis device 10 according to a first example embodiment of the present invention. The malware analysis device 10 is a device that analyzes whether a sample 21 that is software to be examined and is suspected to be malware is a new type of malware different from known malware or not. The malware analysis device 10 analyzes whether a sample 21 is a new type of malware or not, on the basis of similarity between an operation of the sample 21 and an operation of known malware.

A sample 21 is executed by a sample execution device 20 communicably connected to the malware analysis device 10. The sample execution device 20 is, for example, an information processing device in which a sandbox that is an isolated environment for executing the sample 21 is constructed. The sample execution device 20 generates an operation log upon execution of the sample 21 and inputs the operation log to the malware analysis device 10. The sample execution device 20 inputs, at that time, as an identifier capable of identifying the sample 21, for example, an execution file name of the sample 21 or a message digest algorithm 5 (MD 5) hash value to the malware analysis device 10, together with the operation log.

The sample execution device 20 includes a function of detecting an illegal operation executed by a sample 21. The illegal operation includes, for example, calling of a specific application programming interface (API), code injection, stop of a security related service, generation of an execution file, execution of a script file, modification of a value for a specific registry (a storage area storing setting information and the like for a system), communication with a suspicious communication destination, and the like.

The malware analysis device 10 according to the present example embodiment includes an abstraction unit (abstractor) 11, a calculation unit (calculator) 12, a specifying unit (specifier) 13, an operation log storage unit 14, an abstraction log storage unit 15, an abstraction rule storage unit 16, an abstraction rule generation unit (generator) 17, a difference analysis unit (analyzer) 18, and a presentation control unit (controller) 19.

The operation log storage unit 14 is a storage device such as a magnetic disk, an electronic memory, or the like. The operation log storage unit 14 stores, as a sample operation log 140, an operation log indicating an execution result of a sample 21 input from the sample execution device 20. The operation log storage unit 14 stores, as a known malware operation log 141, operation logs of one or more pieces of known malware executed by the sample execution device 20 and the like in the past in association with identifiers capable of identifying these pieces of known malware.

The abstraction unit 11 abstracts (simplifies) the sample operation log 140 read from the operation log storage unit 14 on the basis of an abstraction rule 160 and generates an abstracted result as a sample abstraction log 110. The abstraction rule 160 is stored on the abstraction rule storage unit 16 that is a storage device such as a magnetic disk, an electronic memory, or the like. The abstraction rule 160 may be provided from an outside by a user or may be generated by the abstraction rule generation unit 17 to be described later. Details of an operation of the abstraction unit 11 are described by using FIGS. 2 to 4.

FIG. 2 is a diagram conceptually and exemplarily illustrating a configuration of the abstraction rule 160 according to the present example embodiment. FIG. 3 is a diagram conceptually and exemplarily illustrating a configuration of the sample operation log 140 according to the present example embodiment. FIG. 4 is a diagram conceptually and exemplarily illustrating a configuration of the sample abstraction log 110 according to the present example embodiment.

As exemplarily illustrated in FIG. 3, the sample operation log 140 includes a record (row) including fields that are "sample ID (ID represents "identifier", similar in the following)", "Seq (sequential). No (number).", and "log entry". The "sample ID" is an identifier capable of identifying a sample 21, and in the example illustrated in FIG. 3, a value of "L1" is set. The "Seq. No." is a value indicating a sequence of an operation upon execution of the sample 21 by the sample execution device 20. In other words, an individual record included in the sample operation log 140 exemplarily illustrated in FIG. 3 is operation information indicating an operation of the sample 21 observed by executing the sample 21, and the sample operation log 140 indicates nine pieces of operation information acquired by executing the sample 21 identified as "L1".

The "log entry" indicates details of operation information of the sample 21 at each time at which an operation is executed. The "log entry" includes items of "type", "mode", "path", "key", "value", "host" "pid", "parent_pid", "timestamp", and the like.

In a record exemplarily illustrated in FIG. 3 in which, for example, "Seq. No." is "1", "type" is set as "process". This indicates that the record is operation information indicating a state of a process (program) executed during execution of the sample 21. The record in which "Seq. No." is "1" indicates that "mode" is "start" and indicates that "path" is "\temp\abcde.exe". This indicates that the record is operation information indicating that execution of a process of "\temp\abcde.exe" is started. However, "\" is a code representing a hierarchical structure of a file. As a code representing a hierarchical structure, "\" may be used. "Pid" included in the record in which "Seq. No." is "1" is an identifier capable of identifying the process, and "parent_pid" is an identifier capable of identifying a parent process from which the process has been read. "Timestamp" included in the record in which "Seq. No." is "1" indicates a time at which the record is generated.

A record exemplarily illustrated in FIG. 3 in which, for example, "Seq. No." is "2" indicates that "type" is "registry". This indicates that the record is operation information indicating contents of an access to a registry. The record in which "Seq. No." is "2" indicates that "mode" is "set-value", "key" is "HKCU\software\key1", and "value" is "1". This indicates that the record is operation information indicating that a value "1" has been set for a registry of "HKCU\software\key1". Contents indicated by a record in which "Seq. No." is "3" are also similar to the contents indicated by the record in which "Seq. No." is "2".

Records exemplarily illustrated in FIG. 3 in which "Seq. No." is "4", "5", and "8" indicate contents of an access to a file. Records in which "Seq. No." is "6" and "7" indicate contents of an access to a communication network. A record in which "Seq. No." is "9" indicates that "pid" in which the execution start has been indicated in the record in which "Seq. No." is "1" indicates an execution end of a process of "111".

The abstraction unit 11 abstracts (simplifies) the sample operation log 140 exemplarily illustrated in FIG. 3 on the basis of the abstraction rule 160 exemplarily illustrated in FIG. 2. As exemplarily illustrated in FIG. 2, the abstraction rule 160 is a rule indicating a content of abstraction processing for a log entry with respect to each value of "type" included in a log entry of the sample operation log 140.

The abstraction unit 11 executes the following abstraction processing for a log entry in which "type" is "process" included in the sample operation log 140 in accordance with the abstraction rule 160 exemplarily illustrated in FIG. 2.

For "type" and "mode", contents thereof are maintained (i.e., abstraction is not executed).

For "path", abstraction is executed down to a depth of "1" (i.e., information indicating a hierarchy deeper than a depth of "1" is deleted).

Thereby, the abstraction unit 11 generates a log entry of a record in which "Seq. No." is "1" in the sample abstraction log 110 exemplarily illustrated in FIG. 4, on the basis of a log entry of a record in which "Seq. No." is "1" in the sample operation log 140 exemplarily illustrated in FIG. 3. As exemplarily illustrated in FIG. 4, in the log entry in which "Seq. No." is "1" in the sample abstraction log 110, for "type" and "mode", a content of a log entry illustrated in FIG. 3 is maintained, and for "path", a content of a log entry illustrated in FIG. 3 is abstracted down to a depth of "1". The abstraction unit 11 deletes an item for which a rule is not indicated in the abstraction rule 160. Therefore, the abstraction unit 11 generates a sample abstraction log 110 while items of "pid", "parent_pid", and "timestamp" included in the log entry of the record in which "Seq. No." is "1" in the sample operation log 140 exemplarily illustrated in FIG. 3 are deleted.

The abstraction unit 11 executes the following abstraction processing for a log entry in which "type" is "file" included in the sample operation log 140 in accordance with the abstraction rule 160 exemplarily illustrated in FIG. 2.

For "type" and "mode", contents thereof are maintained (i.e., abstraction is not executed).

For "path", abstraction is executed down to a depth of "1" (i.e., information indicating a hierarchy deeper than a depth of "1" is deleted).

An extension included in "path" is extracted as an item of "ext".

Thereby, the abstraction unit 11 generates log entries of records in which "Seq. No." is "4", "5", and "8" in the sample extraction log 110 exemplarily illustrated in FIG. 4 on the basis of log entries of records in which "Seq. No." is "4", "5", and "8" in the sample operation log 140 exemplarily illustrated in FIG. 3. The abstraction unit 11 executes abstraction processing similar to abstraction processing for the log entry of the record in which "Seq. No." is "1" with respect to items of "type", "mode", "path", "pid", and "timestamp" in these log entries. The abstraction unit 11 generates a sample extraction log 110 in which an extension "txt" included in "path" in the log entries in which "Seq. No." is "4" and "5" in the sample operation log 140 is extracted as an item of "ext". Similarly, the abstraction unit 11 generates a sample extraction log 110 in which an extension "dat" included in "path" in the log entry in which "Seq. No." is "8" in the sample operation log 140 is extracted as an item of "ext".

The abstraction unit 11 executes, also for a log entry in which "type" is "network" included in the sample operation log 140, abstraction processing in accordance with the abstraction rule 160 exemplarily illustrated in FIG. 2. In other words, the abstraction unit 11 generates log entries of records in which "Seq. No." is "6" and "7" in the sample abstraction log 110 exemplarily illustrated in FIG. 4 on the basis of log entries of records in which "Seq. No." is "6" and "7" in the sample operation log 140 exemplarily illustrated in FIG. 3. The abstraction unit 11 stores, on the abstraction log storage unit 15, the generated sample abstraction log 110 in association with an identifier capable of identifying the sample 21, as a part of a known malware abstraction log 150. The abstraction log storage unit 15 is a storage device such as a magnetic disk, an electronic memory, or the like.

FIG. 5 is a diagram conceptually and exemplarily illustrating a configuration of the known malware operation log 141 according to the present example embodiment. For convenience of description, FIG. 5 exemplarily illustrates an operation log of one piece of known malware, but the known malware operation log 141 includes operation logs of one or more pieces of known malware. Each operation log of known malware is associated with an identifier capable of identifying the known malware. A configuration of the known malware operation log 141 is similar to the configuration of the sample operation log 140 exemplarily illustrated in FIG. 3 described above.

FIG. 6 is a diagram conceptually and exemplarily illustrating a configuration of the known malware abstraction log 150 according to the present example embodiment. The known malware abstraction log 150 exemplarily illustrated in FIG. 6 indicates a result acquired by abstracting the known malware operation log 141 exemplarily illustrated in FIG. 5 on the basis of the abstraction rule 160.

The calculation unit 12 illustrated in FIG. 1 calculates similarity between a sample abstraction log 110 generated by the abstraction unit 11 and a known malware abstraction log 150 with respect to one or more pieces of known malware stored on the abstraction log storage unit 15.

FIG. 7 is a table illustrating an example in which the calculation unit 12 calculates, for example, a Manhattan distance based on a frequency histogram with respect to a log entry and thereby calculates similarity between the sample abstraction log 110 exemplarily illustrated in FIG. 4 and the known malware abstraction log 150 exemplarily illustrated in FIG. 6. FIG. 7 illustrates a frequency histogram with respect to a sample abstraction log 110 in which a sample ID is "L1" and a known malware abstraction log 150 in which a sample ID is "L2", by setting a log entry subjected to abstraction processing as a unit.

As exemplarily illustrated in FIG. 7, for example, one log entry indicating a content of "type:process, mode:start, path:\temp" is included in the sample abstraction log 110 exemplarily illustrated in FIG. 4 and in the known malware abstraction log 150 exemplarily illustrated in FIG. 6. Therefore, a difference in frequency, with respect to the log entry, between the sample abstraction log 110 and the known malware abstraction log 150 is "0". Further, as exemplarily illustrated in FIG. 7, for example, two log entries indicating a content of "type:registry, mode:set-value, key:HKCU\software" are included in the sample abstraction log 110 exemplarily illustrated in FIG. 4 and one log entry indicating a content of "type:registry, mode:set-value, key:HKCU\software" is included in the known malware abstraction log 150 exemplarily illustrated in FIG. 6. Therefore, a difference in frequency, with respect to the log entry, between the sample abstraction log 110 and the known malware abstraction log 150 is "1".

As exemplarily illustrated in FIG. 7, a total value of differences in frequency with respect to all log entries between the sample abstraction log 110 exemplarily illustrated in FIG. 4 and the known malware abstraction log 150 exemplarily illustrated in FIG. 6, i.e., a Manhattan distance, is "5". In this manner, the calculation unit 12 calculates a Manhattan distance based on a frequency histogram with respect to a log entry as an indicator indicating similarity between the sample abstraction log 110 and the known malware abstraction log 150. In this case, it is indicated that as a Manhattan distance is closer (shorter), similarity is higher. Alternatively, the calculation unit 12 may calculate a Euclidean distance based on a frequency histogram with respect to a log entry as an indicator indicating similarity. Alternatively, the calculation unit 12 may use a relative frequency histogram when calculating similarity. Alternatively, the calculation unit 12 may normalize a histogram used when calculating similarity. The calculation unit 12 executes the processing described above for one or more pieces of known malware an abstraction log of which is stored on the abstraction log storage unit 15.

The specifying unit 13 illustrated in FIG. 1 specifies known malware for which similarity calculated by the calculation unit 12 satisfies a criterion. The specifying unit 13 specifies, when the calculation unit 12 calculates, for example, a distance based on a frequency histogram with respect to a log entry as an indicator indicating similarity between a sample abstraction log 110 and a known malware abstraction log 150, known malware ranked as a predetermined order or higher with respect to closeness of the distance. Alternatively, the specifying unit 13 may specify known malware in which a value indicating the distance is equal to or less than a threshold. However, it is assumed that the predetermined order and the threshold for a distance described above are previously provided, for example, by a user or the like.

The difference analysis unit 18 illustrated in FIG. 1 generates information indicating a difference between a sample abstraction log 110 and a known malware abstraction log 150 for known malware specified by the specifying unit 13. The difference analysis unit 18 determines, as information indicating the difference, a shortest edit script (SES) for generating a known malware abstraction log 150 from a sample abstraction log 110, for example, by setting a log entry in the sample abstraction log 110 and the known malware abstraction log 150 as a unit. The difference analysis unit 18 generates, on the basis of the determined shortest edit script, information indicating a correspondence relationship between a log entry included in the sample abstraction log 110 and a log entry included in the known malware abstraction log 150.

The difference analysis unit 18 is able to determine the shortest edit script, for example, by using an algorithm such as dynamic programming and the like. FIG. 8 is a table illustrating an example in which the difference analysis unit 18 determines a shortest edit script SES for generating the known malware abstraction log 150 exemplarily illustrated in FIG. 6 from the sample abstraction log 110 exemplarily illustrated in FIG. 4 on the basis of a correspondence relationship between log entries in these abstraction logs.

According to the shortest edit script SES illustrated in FIG. 8, an edit type of a first (an edit order is "1") edit is "common". This indicates that a log entry in which "Seq. No." in the sample abstraction log 110 is "1" and a log entry in which "Seq. No." in the known malware abstraction log 150 is "1" are common (are not modified). Similarly, with regard to a second edit in the shortest edit script SES, it is indicated that a log entry in which "Seq. No." in the sample abstraction log 110 is "2" and a log entry in which "Seq. No." in the known malware abstraction log 150 is "2" are common.

According to the shortest edit script SES illustrated in FIG. 8, an edit type of a third edit is "deletion". This indicates that a log entry in which "Seq. No." in the sample abstraction log 110 is "3" is deleted. A fourth edit type in the shortest edit script SES is "addition L2-3". However, "L2-3" indicates a log entry in which "Seq. No." in an abstraction log (i.e., a known malware abstraction log 150) where a detection ID is "L2" is "3". In other words, it is indicated that a fourth edit in the shortest edit script SES adds a log entry in which "Seq. No." is "3" in the known malware abstraction log 150.

A fifth edit and the flowing edits in the shortest edit script SES illustrated in FIG. 8 are also similar to the edits described above. In this manner, the known malware abstraction log 150 exemplarily illustrated in FIG. 6 is generated by executing twelve edits illustrated in FIG. 8 in order for the sample abstraction log 110 exemplarily illustrated in FIG. 4.

The difference analysis unit 18 may add an edit operation such as "modification" or the like to "common", "deletion", and "addition" described above, as an edit operation included in a shortest edit script. Further, information generated by the difference analysis unit 18 is not limited to the shortest edit script described above. The difference analysis unit 18 may generate, for example, an edit script that is not shortest or information indicating a difference, having a format different from an edit script, between log entries.

The difference analysis unit 18 may further extract specific log entries for which a predetermined condition indicated by a user is satisfied from among log entries in a sample operation log 140, a sample abstraction log 110, a known malware operation log 141, and a known malware abstraction log 150 and generate information indicating a difference between the extracted log entries. In this case, the predetermined condition may be, for example, that "a specified process ID is included", ""type" is a specified value", or "a specified item satisfies a specific condition".

The presentation control unit 19 illustrated in FIG. 1 presents (displays), on a presentation device 30, information indicating a difference between a sample abstraction log 110 generated by the difference analysis unit 18 and a known malware abstraction log 150 for known malware specified by the specifying unit 13. The presentation device 30 may be, for example, a monitor that displays information on a screen or a printer that displays information on paper.

FIGS. 9A and 9B each are a diagram illustrating a presentation example in which the presentation control unit 19 presents a correspondence relationship between log entries to the presentation device 30 with respect to a sample abstraction log 110 and a known malware abstraction log 150, on the basis of a shortest edit script SES generated by the difference analysis unit 18. As exemplarily illustrated in FIGS. 9A and 9B, the presentation control unit 19 presents a difference between a sample abstraction log 110 and a known malware abstraction log 150 to the presentation device 30, by using a presentation form similar to, for example, a form for presentation by a "diff" tool well-known as a tool for comparing files. In other words, the presentation control unit 19 presents, in the same row side by side log, entries in which, for example, "Seq. No." is "1" and "2" in a sample abstraction log 110 and a known malware abstraction log 150, since contents of the log entries are equal to each other. The presentation control unit 19 presents, in different rows, log entries in which, for example, "Seq. No." is "3" in the sample abstraction log 110 and the malware abstraction log 150, since contents of the log entries are different from each other. Such presentation can be achieved by displaying log entries in which an edit type corresponds to "common" in the same row side by side and by not displaying log entries corresponding to "addition" and "deletion" in the same row as for a log entry of another sample.

The presentation control unit 19 may further present a portion where a difference occurs between a sample abstraction log 110 and a known malware abstraction log 150 to the presentation device 30, by using a presentation form such as modification of a character style, modification of a character color, or the like (i.e., through emphasis) different from a presentation form for a portion where a difference does not occur. The presentation control unit 19 may further present contents of a sample operation log 140 and a known malware operation log 141 or information capable of clearly expressing these operation logs (e.g. an identifier capable of identifying the operation log) to the presentation device 30 in accordance with an instruction issued by a user. The presentation control unit 19 may further present a time at which an illegal operation executed by a sample 21 is detected by the sample execution device 20 to the presentation device 30. The presentation control unit 19 may further present information (e.g. a distance) indicating similarity between a sample abstraction log 110 and a known malware abstraction log 150 calculated by the calculation unit 12 to the presentation device 30. The presentation control unit 19 may further include a function of presenting, when, while a sample abstraction log 110 and a known malware abstraction log 150 are presented, a user selects any one log entry in these abstraction logs, operation information before abstraction of the log entry by the abstraction unit 11 to the presentation device 30.

The abstraction rule generation unit 17 illustrated in FIG. 1 analyzes a sample operation log 140 and a known malware operation log 141 stored, for example, on the operation log storage unit 14 and thereby generates an abstraction rule 160. The abstraction rule generation unit 17 stores the generated abstraction rule 160 on the abstraction rule storage unit 16.

The abstraction rule generation unit 17 maintains, for example, an item in which a cardinality is low from among items included in a log entry in an operation log and generates an abstraction rule 160 for issuing an instruction for deleting an item having a high cardinality. However, a matter that "a cardinality is low" indicates that there are a small number of types of values able to be taken by an item, and inversely, a matter that "a cardinality is high" indicates that there are a large number of types of values able to be taken by an item.

For example, values able to be taken by an item of "type" included in the sample operation log 140 exemplarily illustrated in FIG. 3 or the known malware operation log 141 exemplarily illustrated in FIG. 5 are a limited number of reserved words including "process", "registry", "file", "network", and the like. Similarly, values able to be taken by an item of "mode" are a limited number of reserved words including "start", "set-value", "open", "close", "dns", "http", "remove", "stop", and the like. Therefore, items of "type" and "mode" can be said to be an item in which a cardinality is low. Inversely, for example, items such as "pid" and "timestamp" can be said to be an item in which a cardinality is high, the item being able to take various values, depending on an execution environment and an execution time upon execution of a sample 21 or known malware. Therefore, the abstraction rule generation unit 17 generates, as exemplarily illustrated in FIG. 2, an abstraction rule 160 for issuing an instruction for maintaining contents of items of "type" and "mode", and deleting contents of items of "pid" and "timestamp" by not expressing the items as an abstraction rule.

The abstraction rule generation unit 17 further abstracts an item indicating data having a hierarchical structure in a log entry of an operation log and generates an abstraction rule 160 in such a way that a cardinality of the item is equal to or less than a threshold. In this case, the abstraction rule generation unit 17 extracts, for example, a log entry including an item of "path" or "key" from a sample operation log 140 and a known malware operation log 141. The abstraction rule generation unit 17 determines, for data having a hierarchical structure included in an item of "path" or "key", the number of types of data existing in each depth of the hierarchical structure. In this case, as the hierarchical structure becomes deeper, the number of types of data increases, and therefore a cardinality therefor becomes high. In the example exemplified in the figures, the abstraction rule generation unit 17 executes such processing and thereby generates an abstraction rule 160 for issuing an instruction for abstracting "path" down to a depth of "1" and abstracting "key" down to a depth of "2".

Next, with reference to a flowchart of FIG. 10, an operation (processing) of the malware analysis device 10 according to the present example embodiment is described in detail.

A sample operation log 140 output from the sample execution device 20 as a result acquired by executing a sample 21 is stored on the operation log storage unit 14 (step S101). The abstraction unit 11 generates a sample abstraction log 110 acquired by abstracting, on the basis of an abstraction rule 160, the sample operation log 140 stored on the operation log storage unit 14 (step S102).

The calculation unit 12 calculates similarity between the sample abstraction log 110 generated by the abstraction unit 11 and a known malware abstraction log 150 with respect to one or more pieces of known malware stored on the operation log storage unit 15 (step S103). The specifying unit 13 specifies known malware for which the similarity calculated by the calculation unit 12 satisfies a criterion (step S104).

The difference analysis unit 18 analyzes a difference between the sample abstraction log 110 and the known malware abstraction log 150 with respect to the known malware specified by the specifying unit 13 (step S105). The presentation control unit 19 presents a result acquired by analyzing the difference by the difference analysis unit 18 to the presentation device 30 (step S106), and the whole processing is terminated.

The malware analysis device 10 according to the present example embodiment is able to efficiently and highly accurately analyze similarity in operation between software (a sample) to be examined and known malware. The reason is that the malware analysis device 10 generates a sample abstraction log 110 acquired by abstracting a sample operation log 140, calculates similarity between the generated sample abstraction log 110 and a known malware abstraction log 150, and specifies known malware for which the similarity satisfies a criterion.

Advantageous effects achieved by the malware analysis device 10 according to the present example embodiment are described in detail below.

Recently, as one technique for coping with new types of malware multifariously customized occurring one after another, attention is paid to a technique for executing and detecting malware by using a sandbox. This technique executes a sample in a sandbox, monitors whether or not the sample exhibits a behavior characteristic of malware, and detects that the sample is malware. However, usually, due to characteristics of an operation log managed as unstructured data, there is a problem that regardless of intrinsic similarity between operations, the similarity is concealed and accuracy in analysis of malware is decreased.

For such a problem, in the malware analysis device 10 according to the present example embodiment, the abstraction unit 11 generates a sample abstraction log 110 acquired by abstracting a sample operation log 140 indicating an operation result of a sample 21. The abstraction log storage unit 15 stores a known malware abstraction log 150 that is a known malware operation log 141 being abstracted, the known malware operation log 141 indicating one or more operation results for each piece of known malware of a comparison target for the sample 21. The calculation unit 12 calculates similarity between the sample abstraction log 110 and the known malware abstraction log 150. The specifying unit 13 specifies known malware of a comparison target for which the similarity satisfies a criterion. In other words, the malware analysis device 10 analyzes similarity while abstracting an operation log and thereby avoids concealment of the similarity. Thereby, the malware analysis device 10 according to the present example embodiment is able to efficiently and highly accurately analyze similarity in operation between a sample to be examined and known malware.

Further, the abstraction unit 11 according to the present example embodiment abstracts a sample operation log 140 on the basis of an abstraction rule 160 that issues an instruction for item deletion, or deletion or modification of at least a part of information included in the item with respect to each item included in the sample operation log 140. The abstraction rule 160 indicates that information that is less important in analysis of similarity such as an identifier capable of identifying a process, a timestamp, a file name, an address in a memory, and the like is deleted. Thereby, the malware analysis device 10 according to the present example embodiment is able to appropriately abstract a sample operation log 140.

Further, the abstraction unit 11 according to the present example embodiment deletes an item for which a rule is not indicated (is not registered) in an abstraction rule 160. Thereby, the malware analysis device 10 according to the present example embodiment is able to avoid, when an unknown item is included in a sample operation log 140, concealment of similarity due to a difference in a configuration specification of an operation log relating to the unknown item.

Further, the malware analysis device 10 according to the present example embodiment includes the difference analysis unit 18 that generates, for example, a shortest edit script and the like indicating a difference between a sample operation log 140 and a known malware abstraction log 150. Thereby, the malware analysis device 10 according to the present example embodiment is able to efficiently and highly accurately analyze whether a sample is a new type of malware or not, and the like.

Further, the difference analysis unit 18 according to the present example embodiment extracts specific log entries that satisfy a predetermined condition indicated by a user from among log entries in a sample operation log 140, a sample abstraction log 110, a known malware operation log 141, and a known malware abstraction log 150 and generates information indicating a difference between the extracted log entries. Thereby, the malware analysis device 10 according to the present example embodiment generates information indicating a difference in which a log entry to be analyzed is narrowed down and therefore can be enhanced efficiency of analysis work performed by a user.

Further, the malware analysis device 10 according to the present example embodiment includes the presentation control unit 19 that presents, to the presentation device 30, at least any one of a known malware operation log 141 or a known malware abstraction log 150, similarity calculated by the calculation unit 12, or information indicating a difference generated by the difference analysis unit 18, with respect to known malware specified by the specifying unit 13. The presentation control unit 19 presents, to the presentation device 30, by setting a log entry as a unit, log entries in the same row side by side in which it is indicated that there is no difference in information indicating a difference. The presentation control unit 19 further presents a difference portion in information indicating a difference to the presentation device 30 by emphasizing the difference portion. The presentation control unit 19 further presents, to the presentation device 30, when a user has selected any one log entry, an operation log before abstraction of the log entry by the abstraction unit 11, while a sample abstraction log 110 and a known malware abstraction log 150 are presented. The malware analysis device 10 according to the present example embodiment is able to further enhance efficiency of analysis work performed by a user, by using the function described above included in the presentation control unit 19.

Further, the malware analysis device 10 according to the present example embodiment includes the abstraction rule generation unit 17 that generates an abstraction rule 160 in such a way that a type of a value able to be taken by information included in an item satisfies a criterion (a cardinality is equal to or less than a threshold). The abstraction rule generation unit 17 generates an abstraction rule 160 indicating a depth of a hierarchy where an item indicating data having a hierarchical structure such as a file pass or a registry key is abstracted and thereby a type of a value able to be taken by the data is equal to or less than a threshold. Thereby, the malware analysis device 10 according to the present example embodiment is able to efficiently generate an appropriate abstraction rule.

Second Example Embodiment

Figure 11:
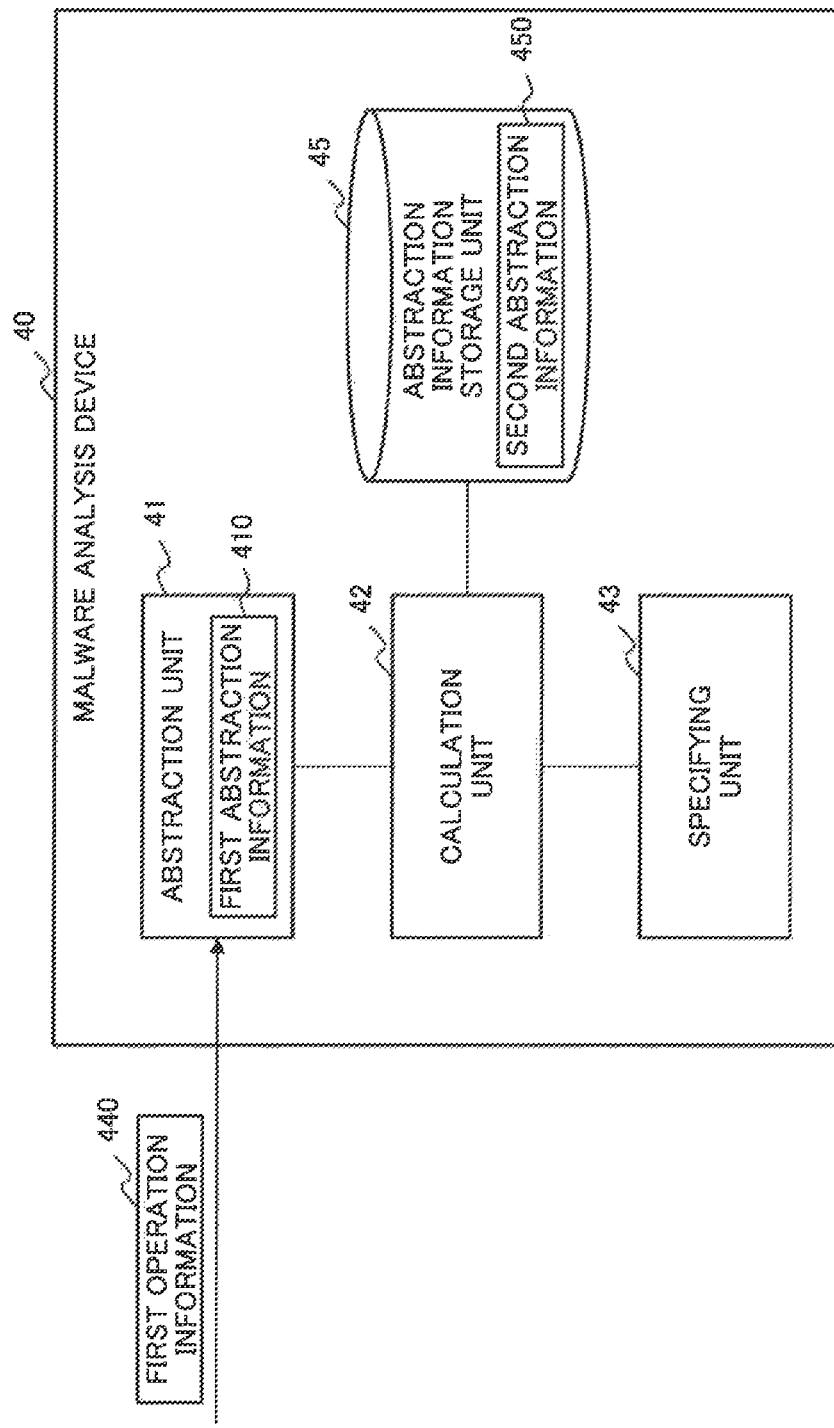
FIG. 11 is a block diagram illustrating a configuration of a malware analysis device 40 according to a second example embodiment of the present invention.

FIG. 11 is a block diagram conceptually illustrating a configuration of a malware analysis device 40 according to a second example embodiment of the present invention. The malware analysis device 40 includes an abstraction unit 41, a calculation unit 42, a specifying unit 43, and an abstraction information storage unit 45.

The abstraction unit 41 generates first abstraction information 410 acquired by abstracting first operation information 440 indicating an operation result of software that is a sample.

The abstraction information storage unit 45 stores second abstraction information 450 that is second operation information being abstracted, the second operation information indicating an operation result with respect to each piece of software (known malware) of a comparison target for the sample.

The calculation unit 42 calculates similarity between the first abstraction information 410 and the second abstraction information 450.

The specifying unit 43 specifies software to be compared for which the similarity satisfies a criterion.

The malware analysis device 40 according to the present example embodiment is able to efficiently and highly accurately analyze similarity in operation between software (a sample) to be examined and software (known malware) that is a comparison target. The reason is that the malware analysis device 40 generates first abstraction information 410 acquired by abstracting first operation information 440, calculates similarity between the generated first abstraction information 410 and second abstraction information 450, and specifies software of a comparison target for which the similarity satisfies a criterion.

Hardware Configuration Example

In the example embodiments described above, each unit in the malware analysis devices illustrated in FIGS. 1 and 11 can be achieved by dedicated hardware (HW) (electronic circuit). Further, in FIGS. 1 and 11, at least the following component each can be conceivable as a function (processing) unit (software module) of a software program.

The abstraction units 11 and 41,
the calculation units 12 and 42,
the specifying units 13 and 43,
the abstraction rule generation unit 17,
the difference analysis unit 18, and
the presentation control unit 19.

However, division of the units illustrated in these figures is a configuration for convenience of description, and upon implementation, various configurations are assumable. One example of a hardware environment in this case is described with reference to FIG. 12.

Figure 12:
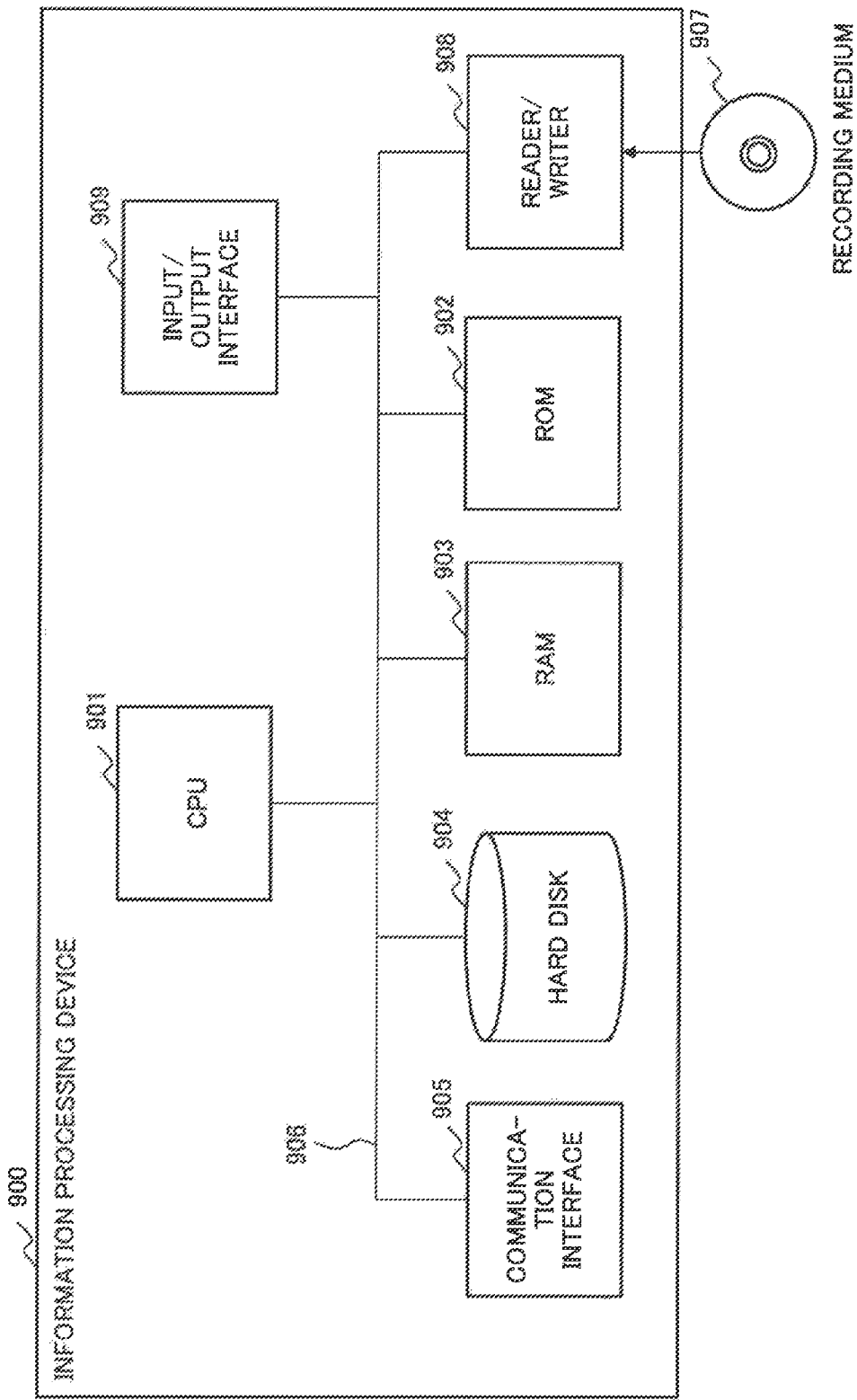
FIG. 12 is a block diagram illustrating a configuration of an information processing device 900 capable of running a malware analysis device according to each example embodiment of the present invention.

FIG. 12 is a diagram exemplarily illustrating a configuration of an information processing device 900 (computer) capable of achieving a malware analysis device according to each example embodiment of the present invention. In other words, FIG. 12 illustrates a configuration of a computer (information processing device) capable of achieving the malware analysis devices illustrated in FIGS. 1 and 11 and a hardware environment capable of achieving the functions in the example embodiments described above.

The information processing device 900 illustrated in FIG. 12 includes the following as components.

A central processing unit (CPU) 901, a read only memory (ROM) 902, a random access memory (RAM) 903, a hard disk (storage device) 904, a communication interface 905 for communicating with an external device, a bus 906 (communication line), a reader/writer 908 capable of reading/writing data stored on a recording medium 907 such as a compact disc read only memory (CD-ROM) and the like, and an input/output interface 909.

In other words, the information processing device 900 including the components is a general computer in which these components are connected via the bus 906. The information processing device 900 may include a plurality of CPUs 901 or may include a CPU 901 including a multicore.

The present invention described by using the example embodiments described above as examples supplies a computer program capable of achieving the following function to the information processing device 900 illustrated in FIG. 12. The function is a function of the configuration described above in the block configuration diagram (FIGS. 1 and 11) referred to for describing the example embodiment or the flowchart (FIG. 10). The present invention is thereafter achieved by reading the computer program on the CPU 901 of the hardware and interpreting and executing the read computer program. Further, a computer program supplied into the device may be stored on a readable/writable transitory memory (RAM 903) or a non-transitory storage device such as the ROM 902 or the hard disk 904.

Further, in such case, as a method for supplying a computer program into the hardware, currently, a general procedure is employable. The procedure includes, for example, a method of installing into the device via various types of storage media 907 such as a CD-ROM and a method of downloading from an outside via a communication line such as the Internet. In such a case, it is conceivable that the present invention includes a code configuring the computer program or the recording medium 907 storing the code.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

A part or the whole of the example embodiments describe above can be described as the following supplementary notes. However, the present invention illustratively described by the example embodiments describe above is not limited to the following.

(Supplementary Note 1)

A malware analysis device including:

an abstraction means that generates first abstraction information acquired by abstracting first operation information indicating an operation result of software being a sample;

an abstraction information storage means that stores second abstraction information that is second operation information being abstracted, the second operation information indicating operation results acquired for each piece of one or more software being compared with the sample;

a calculation means that calculates similarity between the first abstraction information and the second abstraction information; and a specifying means that specifies software for which the similarity satisfies a criterion, the software being compared with the sample.

(Supplementary Note 2)

The malware analysis device according to supplementary note 1, wherein, with respect to each item included in the first operation information, the abstraction means generates the first abstraction information by deleting the item, or deleting or modifying at least a part of information included in the item.

(Supplementary Note 3)

The malware analysis device according to supplementary note 1, further including an abstraction rule storage means that, with respect to each item included in the first operation information, stores an abstraction rule that instructs to delete the item or delete or modify at least a part of information included in the item, wherein the abstraction means generates the first abstraction information on the basis of the abstraction rule, and the abstraction information storage means stores the second abstraction information that the second operation information is abstracted on the basis of the abstraction rule.

(Supplementary Note 4)

The malware analysis device according to supplementary note 3, wherein the abstraction information storage means stores the abstraction rule that instructs to delete information included in the item, the information indicating an identifier capable of identifying a process, a timestamp, a file name, and an address in a memory.

(Supplementary Note 5)

The malware analysis device according to supplementary note 3 or 4, wherein the abstraction means deletes the item that is not registered in the abstraction rule.

(Supplementary Note 6)

The malware analysis device according to any one of supplementary notes 1 to 5, wherein the calculation means calculates a distance between the first abstraction information and the second abstraction information on the basis of a histogram with respect to a log entry including information divided for each operation of the software in the first and the second abstraction information, and the specifying means specifies software whose closeness of the distance is ranked at higher than a predetermined rank position or software whose value indicating the distance is equal to or less than a threshold, the software being compared with the sample.

(Supplementary Note 7)

The malware analysis device according to supplementary note 6, wherein the calculation means calculates a Euclidean distance or a Manhattan distance between the first abstraction information and the second abstraction information.

(Supplementary Note 8)

The malware analysis device according to supplementary note 1, further including a difference analysis means that generates information indicating a difference between the first abstraction information and the second abstraction information.

(Supplementary Note 9)

The malware analysis device according to supplementary note 8, wherein the difference analysis means determines an edit script for generating the second abstraction information from the first abstraction information, by setting, as a unit, a log entry including information divided for each operation of the software in the first and second abstraction information, and generates, on the basis of the determined edit script, information indicating a correspondence relationship between the log entry included in the first abstraction information and the log entry included in the second abstraction information.

(Supplementary Note 10)

The malware analysis device according to supplementary note 9, wherein the difference analysis means determines the edit script indicating an edit operation including at least any one of common, deletion, addition, and modification to the first abstraction information.

(Supplementary Note 11)

The malware analysis device according to any one of supplementary notes 8 to 10, wherein the difference analysis means extracts a specific log entry whose content satisfies a predetermined condition from among log entries including information, divided for each operation of the software. in the first and second operation information and the first and second abstraction information and generates the information indicating the difference with respect to the specific log entry.

(Supplementary Note 12)

The malware analysis device according to any one of supplementary notes 8 to 11, further including a presentation control means that presents, to a presentation device, at least any one of the second operation information or the second abstraction information, the similarity calculated by the calculation means, and the information indicating the difference generated by the difference analysis means, with respect to software being the comparison target specified by the specifying means.

(Supplementary Note 13)

The malware analysis device according to supplementary note 12, wherein the presentation control means presents the log entries indicating that there is no difference in the information indicating the difference, to the presentation device, by using a presentation form in which the log entries are disposed in a same row side by side, by setting, as a unit, a log entry including information, divided for each operation of the software, in the first and second abstraction information.

(Supplementary Note 14)

The malware analysis device according to supplementary note 12 or 13, wherein the presentation control unit presents a difference portion in the information indicating the difference, to the presentation device, by using the presentation form different from a presentation form in which a portion other than the difference portion is presented.

(Supplementary Note 15)

The malware analysis device according to any one of supplementary notes 12 to 14, wherein the presentation control unit presents a specific log entry before being abstracted by the abstraction means to the presentation device, when the specific log entry is selected by an instruction from an outside during presenting to the presentation device, by setting, as a unit, a log entry including information, divided for each operation of the software, in the first and second abstraction information.

(Supplementary Note 16)

The malware analysis device according to supplementary note 3, further including an abstraction rule generation means that generates the abstraction rule in such a way that a number of types of possible values taken by information included in the item satisfies a criterion.

(Supplementary Note 17)

The malware analysis device according to supplementary note 16, wherein the abstraction rule generation means abstracts the item indicating data having a hierarchical structure, and thereby generates the abstraction rule indicating a depth of a hierarchy where the number of unique values taken by the data is equal to or less than a threshold.

(Supplementary Note 18)

A malware analysis method including, when second abstraction information that is second operation information being abstracted, the second operation information indicating operation results acquired for each piece of one or more software being compared with a sample is stored on a storage means, by an information processing device:

generating first abstraction information acquired by abstracting first operation information indicating an operation result of software being the sample;

calculating similarity between the first abstraction information and the second abstraction information; and specifying software for which the similarity satisfies a criterion, the software being compared with the sample.

(Supplementary Note 19)

A recording medium storing a malware analysis program for causing a computer accessible to a storage means that stores second abstraction information that is second operation information being abstracted, the second operation information indicating operation results acquired for each piece of one or more software being compared with a sample, to execute:

abstraction processing of generating first abstraction information acquired by abstracting first operation information indicating an operation result of software being the sample;

calculation processing of calculating similarity between the first abstraction information and the second abstraction information; and specifying processing of specifying software for which the similarity satisfies a criterion, the software being compared with the sample.

REFERENCE SIGNS LIST

10 Malware analysis device
11 Abstraction unit
110 Sample abstraction log
12 Calculation unit
13 Specifying unit
14 Operation log storage unit
140 Sample operation log
141 Known malware operation log
15 Abstraction log storage unit
150 Known malware abstraction log
16 Abstraction rule storage unit
160 Abstraction rule
17 Abstraction rule generation unit
18 Difference analysis unit
19 Presentation control unit 20 Sample execution device
21 Sample
30 Presentation device
40 Malware analysis device
410 First abstraction information
42 Calculation unit
43 Specifying unit
440 First operation information
45 Abstraction information storage unit
450 Second abstraction information
900 Information processing device
901 CPU
902 ROM
903 RAM
904 Hard disk (storage device)
905 Communication interface
906 Bus
907 Recording medium
908 Reader/writer
909 Input/output interface

The invention claimed is:

1. A malware analysis device comprising:
one or more processors;
an abstractor implemented by the one or more processors and configured to generate first abstraction information acquired by abstracting first operation information indicating an operation result of first software being a sample;
an abstraction information storage configured to store second abstraction information that is second operation information being abstracted, the second operation information indicating operation results acquired for one or more second software being compared with the sample;
a calculator implemented by the one or more processors and configured to calculate similarity between the first abstraction information and the second abstraction information; and
a specifier implemented by the one or more processors and configured to specify a third software for which the similarity satisfies a criterion, wherein the one or more second software comprises the third software; wherein
the calculator calculates a distance between the first abstraction information and the second abstraction information, based on a histogram with respect to a log entry including information divided for each operation of the first software and each operation of the one or more second software in the first and second abstraction information, respectively, and
the specifier specifies the third software whose closeness of the distance is ranked at higher than a predetermined rank position or the third software whose value indicating the distance is equal to or less than a threshold.

2. The malware analysis device according to claim 1, wherein,
with respect to each item included in the first operation information, the abstractor generates the first abstraction information by deleting the item, or deleting or modifying at least a part of information included in the item.

3. The malware analysis device according to claim 1, further comprising
an abstraction rule storage configured to, with respect to each item included in the first operation information, store an abstraction rule that instructs to delete the item or delete or modify at least a part of information included in the item, wherein
the abstractor generates the first abstraction information, based on the abstraction rule, and
the abstraction information storage stores the second abstraction information that is the second operation information being abstracted, based on the abstraction rule.

4. The malware analysis device according to claim 3, wherein
the abstraction information storage stores the abstraction rule that instructs to delete information included in the item, the information indicating an identifier capable of identifying a process, a timestamp, a file name, and an address in a memory.

5. The malware analysis device according to claim 3, wherein
the abstractor deletes the item that is not registered in the abstraction rule.

6. The malware analysis device according to claim 1, wherein
the calculator calculates a Euclidean distance or a Manhattan distance between the first abstraction information and the second abstraction information.

7. The malware analysis device according to claim 1, further comprising
a difference analyzer implemented by the one or more processors and configured to generate information indicating a difference between the first abstraction information and the second abstraction information.

8. The malware analysis device according to claim 7, wherein
the difference analyzer determines an edit script for generating the second abstraction information from the first abstraction information, by setting, as a unit, a log entry including information divided for each operation of the first software and one or more second software in the first and second abstraction information, and generates, based on the determined edit script, information indicating a correspondence relationship between the log entry included in the first abstraction information and the log entry included in the second abstraction information.

9. The malware analysis device according to claim 8, wherein
the difference analyzer determines the edit script indicating an edit operation including at least any one of common, deletion, addition, and modification to the first abstraction information.

10. The malware analysis device according to claim 7, wherein
the difference analyzer extracts a specific log entry whose content satisfies a predetermined condition from among log entries including information, divided for each operation of the first software and one or more second software, in the first and second operation information and the first and second abstraction information, and generates the information indicating the difference with respect to the specific log entry.

11. The malware analysis device according to claim 7, further comprising
a presentation controller implemented by the one or more processors for presenting, to a presentation device, at least any one of the second operation information or the second abstraction information, the similarity calculated by the calculator, and the information indicating the difference generated by the difference analyzer, with respect to the third software specified by the specifier.

12. The malware analysis device according to claim 11, wherein the presentation controller presents the log entries indicating that there is no difference in the information indicating the difference, to the presentation device, by using a presentation form in which the log entries are disposed in a same row side by side, by setting, as a unit, a log entry including information, divided for each operation of the first software and one or more second software, in the first and second abstraction information.

13. The malware analysis device according to claim 11, wherein the presentation controller presents a difference portion in the information indicating the difference, to the presentation device, by using the presentation form different from a presentation form in which a portion other than the difference portion is presented.

14. The malware analysis device according to claim 11, wherein the presentation controller presents a specific log entry before being abstracted by the abstractor to the presentation device, when the specific log entry is selected by an instruction from an outside during presenting to the presentation device, by setting, as a unit, a log entry including information, divided for each operation of the first software and one or more second software, in the first and second abstraction information.

15. The malware analysis device according to claim 3, further comprising an abstraction rule generator implemented by the one or more processors and configured to generate the abstraction rule in such a way that a number of types of possible values taken by information included in the item satisfies a criterion.

16. The malware analysis device according to claim 15, wherein the abstraction rule generator abstracts the item indicating data having a hierarchical structure, and thereby generates the abstraction rule indicating a depth of a hierarchy where the number of unique values taken by the data is equal to or less than a threshold.

17. A malware analysis method comprising, when second abstraction information that is second operation information being abstracted, the second operation information indicating operation results acquired for one or more second software being compared with a sample is stored on storage, by an information processing device:

generating first abstraction information acquired by abstracting first operation information indicating an operation result of first software being the sample;

calculating similarity between the first abstraction information and the second abstraction information;

specifying a third software for which the similarity satisfies a criterion, wherein the one or more second software comprises the third software;

calculating a distance between the first abstraction information and the second abstraction information, based on a histogram with respect to a log entry including information divided for each operation of the first software and each operation of the one or more second software in the first and second abstraction information, respectively; and specifying the third software whose closeness of the distance is ranked at higher than a predetermined rank position or the third software whose value indicating the distance is equal to or less than a threshold.

18. A non-transitory computer-readable recording medium storing a malware analysis program for causing a computer accessible to storage for storing second abstraction information that is second operation information being abstracted, the second operation information indicating operation results acquired for one or more second software being compared with a sample, to execute:

abstraction processing of generating first abstraction information acquired by abstracting first operation information indicating an operation result of first software being the sample;

calculation processing of calculating similarity between the first abstraction information and the second abstraction information; and specifying processing of specifying a third software for which the similarity satisfies a criterion, wherein the one or more second software comprises the third software;

the calculation processing calculates a distance between the first abstraction information and the second abstraction information, based on a histogram with respect to a log entry including information divided for each operation of the first software and each operation of the one or more second software in the first and second abstraction information, respectively, and the specifying processing specifies the third software whose closeness of the distance is ranked at higher than a predetermined rank position or the third software whose value indicating the distance is equal to or less than a threshold.

* * * * *